United States Patent [19]

Schlinger

[11] Patent Number: 4,781,731
[45] Date of Patent: Nov. 1, 1988

[54] INTEGRATED METHOD OF CHARGE FUEL PRETREATMENT AND TAIL GAS SULFUR REMOVAL IN A PARTIAL OXIDATION PROCESS

[75] Inventor: Warren G. Schlinger, Pasadena, Calif.

[73] Assignee: Texaco Inc., White Plains, N.Y.

[21] Appl. No.: 140,280

[22] Filed: Dec. 31, 1987

[51] Int. Cl.⁴ ............................................... C10S 3/46
[52] U.S. Cl. .................................. 48/197 R; 48/206; 48/215; 252/373; 423/573 G
[58] Field of Search ............... 48/197 R, 202, 206, 48/212, 215, DIG. 2; 252/273; 423/230, 573 G

[56] References Cited

U.S. PATENT DOCUMENTS

| | | | |
|---|---|---|---|
| 1,626,664 | 5/1927 | Brody | 423/231 |
| 3,868,817 | 3/1975 | Marian et al. | 252/373 |
| 3,947,547 | 3/1976 | Groenendaal | 423/573 G |
| 4,121,912 | 10/1978 | Barber et al. | 252/373 |
| 4,125,597 | 11/1978 | Fleck | 423/573 R |
| 4,668,428 | 5/1987 | Najjar | 48/197 R |
| 4,692,172 | 9/1987 | Stellaccio | 252/373 |

*Primary Examiner*—Peter Kratz
*Attorney, Agent, or Firm*—Robert A. Kulason; James J. O'Loughlin; Louis S. Sorell

[57] ABSTRACT

In the partial oxidation of a sulfur- and metal-containing carbonaceous charge fuel to produce a sulfur-containing synthesis gas and metal-containing molten slag, an integrated method of charge fuel pretreatment and Claus unit tail gas sulfur removal is provided. The process of the instant invention is advantageous over other partial oxidation processes in that: (i) a fluid, molten slag which flows easily is produced, thereby improving reactor performance; and (ii) the overall removal of sulfur compounds from the synthesis gas is made simpler, more efficient, and less costly, as the need for a conventional Claus unit tail gas sulfur removal process is eliminated.

15 Claims, 2 Drawing Sheets

INTEGRATED METHOD OF CHARGE FUEL PRETREATMENT AND TAIL GAS SULFUR REMOVAL IN A PARTIAL OXIDATION PROCESS

BACKGROUND OF THE INVENTION

1. Field of the Invention

This invention relates to a method of producing a synthesis gas comprising $H_2$ and CO via the partial oxidation gasification of a sulfur- and metal-containing carbonaceous charge fuel. More particularly, this invention relates to an integrated method of (i) pretreating a sulfur- and metal-containing carbonaceous charge fuel to be gasified in a partial oxidation process, and (ii) removing sulfur-containing compounds from the tail gas stream exiting a Claus process sulfur removal unit employed to treat a portion of the gas stream produced by the partial oxidation process.

2. Information Disclosure Statement

It is well known by those skilled in the art that synthesis gas comprising primarily $H_2$ and CO, together with various amounts of other gases, may be produced via the partial oxidation gasification of an ash-containing carbonaceous charge fuel at elevated temperatures. References disclosing such a process include coassigned U.S. Pat. Nos. 2,818,326 (Eastman et al.), 2,896,927 (Nagle et al.), 3,998,609 (Crouch et al.), and 4,218,423 (Robin et al.), all incorporated herein by reference. Such ash-containing carbonaceous charge fuels include crude residue from petroleum distillation and cracking processes, petroleum distillates, reduced crudes, whole crudes, asphalts, coals, coal tars, coal derived oils, petroleum cokes, shale oils, tar sand oils, and mixtures thereof. The production of synthesis gas from such charge fuels is described by, for example, coassigned U.S. Pat. Nos. 3,544,291 (Schlinger et al.), 3,976,442 (Paull et al.) and 3,996,026 (Cole), all incorporated herein by reference.

The abovedescribed ash-containing carbonaceous charge fuels ordinarily contain varying amounts of sulfur and sulfur compounds as well as metals and metal compounds, the metals including vanadium, nickel, and iron. The partial oxidation gasification of the charge fuel produces both raw synthesis gas comprising sulfur and sulfur compounds, particularly $H_2S$, as well as a molten slag comprising various other inorganic materials, including sulfur, sulfur compounds, metals, and metal compounds, the slag being derived from the ash portion of the charge fuel.

A common problem associated with the partial oxidation gasification process is the incomplete melting of the ash portion of the charge fuel. This causes the slag viscosity to increase, resulting in the accumulation of slag, together with its metal constituents, on the walls and refractory of the partial oxixdation gasiciation reactor. This accumulation of slag often leads to reactor operability problems as well as potential damage to the reactor refractory. It has therefore been proposed that various fluxing agents be employed as additives to the charge fuel to decrease the viscosity of the slag formed, thereby facilitating discharge of the slag from the reactor. For example:

Co-assigned U.S. patent application Ser. No. 947,122 filed Dec. 23, 1986 discloses the use of an iron-containing additive introduced into a petroleum coke or liquid hydrocarbon fuel partial oxidation feedstock, thereby producing a liquid phase washing agent that collects and transports vanadium and nickel impurities from the reaction zone;

Co-assigned U.S. Pat. No. 4,692,172 (Stellacio et al.) discloses a partial oxidation process which employs an iron sulfide containing material in admixture with a solid carbonaceous fuel, thereby lowering the melting point of the fuel ash to allow the process to be operated in the molten slagging mode at a lower temperature;

Coassigned U.S. Pat. No. 4,671,804 (Najjar) discloses an iron-containing additive, preferably iron oxide, for use in a partial oxidation gasification process. The additive reduces the viscosity of the molten slag, prevents the formation of toxic nickel subsulfide ($Ni_3S_2$) in the slag, and additionally reduces the concentration of sulfur and sulfur compounds in the raw synthesis gas;

Co-assigned U.S. Pat. Nos. 4,668,428 (Najjar) and 4,668,429 (Najjar) disclose the use, respectively, of iron-containing and iron- and calcium-containing additives in the feedstock of a partial oxidation process to produce a liquid phase washing agent that transports at least a portion of vanadium-oxide compounds out of the reaction zone; and Co-assigned U.S. Pat. No. 4,657,698 (Najjar et al.) discloses the use of an iron- and silicon-containing additive in the feedstock of a partial oxidation process to reduce the ash fusion temperature of the molten ash produced by the process.

Another problem inherent to the partial oxidation gasification process is that it is generally necessary to remove sulfur and sulfur compounds from the raw synthesis gas prior to use of the gas in chemicals production, power generation, and the like. Conventional processes employed in the removal of sulfur and sulfur compounds from synthesis gas (often called acid gas removal processes) are described, for example, in R. F. Probstein and R. E. Hicks, Synthetic Fuels 210-21 (1982), and include both liquid absorption and solid absorption techniques. Many processes are known which employ iron or iron compounds to remove sulfur or sulfur compounds from gas streams. For example:

"Status of Japanese R & D for IGCC Power Generation" (Terenuma et al.), presented at AIChE Summer Meeting, Boston, Mass. (August 1986) discloses at pp. 6-8 the use of a circulating fluidized bed of iron oxide particles to desulfurize raw synthesis gas generated from a coal gasification process;

U.S. Pat. No. 4,572,085 (Hepworth) describes a process for combusting sulfur-containing coal in the presence of a finely divided iron containing material to produce an essentially sulfur-free flue gas and a liquid iron oxysulfide slag;

API Petroleum Processes Abstract No. 86-1102a (June 2, 1986) describes E. German Pat. DD 229906, which discloses a process for desulfurizing a hot synthesis gas by contacting the gas with an iron-containing particulate bed, and thereafter passing the sulfur-containing waste gas produced therein to a lime reactor for contacting with lime and limestone, thereby producing an almost sulfur-free gas stream;

API Petroleum Processes Abstract No. 85-10667 (Apr. 22, 1985) describes Japanese Pat. No. 59230618, which discloses the use of double (metallic) oxide compounds where the metal may be Zn, Fe, Mn or Cu to remove $H_2S$ from high temperature coal gas;

API Conservation, Transportation, Engineering and Storage Abstract No. 86-40675 (May 12, 1986) describes E. German Pat. No. 229039, which discloses the use of combustion plant ash fractions having high metal oxide content (e.g. Ca, Ms, Fe and Al oxides) to remove toxic components (e.g. $SO_2$ and $SO_3$) from flue gases; and API Conservation, Transportation, Engineering and Storage Abstract No. 85-40537 (Apr. 8, 1985) describes USSR Pat. No. 1101286, which discloses a process in which a water slurry of ore enrichment waste material, e.g. pyrrhotite concentrate, tailings from Cu-Ni ore enrichment, or untreated magnetic concentrate, is contacted with $SO_2$-containing gas to remove the $SO_2$ from the gas stream.

When a conventional acid gas removal process is applied to a sulfur-containing synthesis gas, an off-gas stream exiting the acid gas removal process remains containing substantial amounts of sulfur and sulfur compounds. This off-gas stream must therefore be further treated to remove sulfur and sulfur compounds. A Claus process unit is often employed to reduce the sulfur-containing compounds of the off-gas leaving the acid gas removal process to elemental sulfur. In this case, a tail gas exits the Claus unit. However, this tail gas generally still has too high a sulfur content to be released to the atmosphere; therefore a method for additional tail gas desulfurization must often be employed. Claus process units and tail gas clean-up methods are described, for example, in 22 Kirk-Othmer Encyclopedia of Chemical Technology 276-82 (3d ed. 1983). Such processes are often difficult and expensive to operate and maintain.

Given the abovedescribed problems, it would clearly be advantageous to employ a partial oxidation process whereby: (1) the accumulation of slag in the partial oxidation gasification reactor is minimized or eliminated; and (2) the need for Claus unit tail gas sulfur removal is eliminated.

It is the object of this invention to provide an integrated method of producing a synthesis gas via the partial oxidation gasification of a sulfur- and metal-containing carbonaceous charge fuel such that: (i) a fluid, molten slag comprising various metals and metal compounds is produced which flows easily from the discharge outlet of the partial oxidation gasifier reactor, thereby improving performance of the gasifier and preventing unwanted accumulation of slag and metals within the gasifier reactor; and (ii) the overall removal of sulfur-containing compounds from the synthesis gas generated by the partial oxidation process is made more simple and efficient, and less costly via an improved method of Claus process unit tail gas sulfur removal.

It is a feature of this invention that presulfided iron-containing compounds are employed as slag fluxing agents, thereby lowering the viscosity of the molten slag and more immediately encapsulating vanadium compounds and reacting with nickel compounds contained in the slag. It is another feature of this invention that Claus unit tail gas is employed to presulfide iron compound-containing particles which are thereafter used as a slag fluxing agent in a partial oxidation gasification reactor, thereby removing residual sulfur compounds from the tail gas.

It is an advantage of this invention that the presulfided iron-containing slag fluxing agent lowers the viscosity of the molten slag, thereby facilitating the free flow of slag from the partial oxidation reactor and avoiding slag accumulation within the reactor. It is another advantage of this invention that conventional Claus unit tail gas desulfurization processes, which are often difficult and expensive to operate and maintain, are replaced by the tail gas reactor of this invention, thereby combining tail gas desulfurization and iron compound fluxing agent presulfiding in a single operation.

SUMMARY OF THE INVENTION

The instant invention is a method for producing a synthesis gas comprising:
(a) partially oxidizing a sulfur- and metal-containing carbonaceous charge fuel in the presence of a temperature moderator and an oxygen-containing gas to produce a sulfur-containing hot synthesis gas and a metal-containing molten slag;
(b) partially cooling the sulfur-containing synthesis gas via direct or indirect means or a combination thereof;
(c) scrubbing the partially cooled sulfur-containing synthesis gas with aqueous scrubbing liquor to remove particulates and further cool the synthesis gas;
(d) further scrubbing the partially cooled sulfur-containing synthesis gas with a scrubbing liquor to produce:
  (i) a fuel gas stream with a substantially reduced sulfur content; and
  (ii) an off-gas stream comprising sulfur-containing compounds;
(e) directing the off-gas stream comprising sulfur-containing compounds to a Claus process unit to produce elemental sulfur and a tail gas stream comprising residual amounts of sulfur-containing compounds;
(f) contacting the tail gas stream with particles comprising iron-containing compounds, thereby:
  (i) forming iron sulfide-containing particles; and
  (ii) producing an essentially sulfur-free tail gas stream; and
(g) recycling at least a portion of the iron sulfide-containing particles of step (f) by mixing the particles with the carbonaceous charge fuel of step (a) prior to the partial oxidation of the charge fuel.

In a preferred embodiment of the instant invention, petroleum coke slurried with water is employed as the charge fuel, and is partially oxidized to produce a sulfur-containing hot synthesis gas and a metal-containing molten slag. The synthesis gas is treated to remove sulfur compounds, with one step being the contacting of Claus unit tail gas with particles comprising iron-containing compounds, preferably by fluidization of the particles using the tail gas stream, to produce partially sulfided iron-containing compounds. The particles comprising the partially sulfided iron-containing compounds are then mixed with the charge fuel, so that when the charge fuel mixture is partially oxidized, the metal-containing molten slag produced flows easily from the reactor vessel.

DESCRIPTION OF THE PREFERRED EMBODIMENTS

The carbonaceous charge fuels which may be employed in this invention include carbonaceous fuels which are solid at ambient temperature and which contain ash. Typical of such fuels are coals including anthracite, bituminous, sub-bituminous, lignite, coke from coal, petroleum coke, particulate carbon, tar sand, asphalt, pitch, crude residue from petroleum distillation and cracking processes. Such fuels ordinarily contain varying amounts of sulfur and sulfur compounds, as well as metals and metal compounds. The metals include vanadium, nickel, and iron. Typically, these fuels may contain ash in amounts as little as 0.1 w%–0.5 w% or as much as 20 w%–40 w%. They may also contain water in amounts as low as 0 w%–10 w% or as much as 30 w%–40 w% or more. Although the charge fuel may be used without reducing the moisture content, it is preferred, to facilitate grinding and slurrying in the case of those fuels containing large amounts of water, to pre-dry the fuel to a moisture content to 2 w%–20 w% depending on the nature of the fuel. The charge fuel may be ground to a particle size so that preferably 100 w% passes through a 14 mesh sieve and greater than 50 w% has a particle size within the range of 14–325 mesh sieve.

In the case of some pitches, asphalts, and tar sand, it may be possible to feed them as liquids by heating them to just below their decomposition temperature. A ground solid fuel alone may be employed as charge; but preferably the ground solid fuel is slurried in a liquid vaporizable hydrocarbon or water, or it is entrained in a gaseous medium. The solid charge fuel may be slurried with water, a liquid hydrocarbon fuel, liquid $CO_2$ or mixtures thereof. The preferred slurrying agent is water, and it is preferably present in the charge to gasification in amount of 30–120 parts per 100 parts of solid coal or petroleum coke. In typical operations, the ground solid fuel is slurried with the slurrying agent in a slurry preparation tank, where the slurry is prepared to the desired concentration, and thereafter pumped to the partial oxidation reactor by means of a slurry feed pump.

Alternatively, the ground solid fuel may be entrained in a gas such as steam, carbon dioxide, nitrogen, recycle synthesis gas, air, etc. When the charge fuel is a liquid or a gas, no slurrying liquid is admitted with the charge fuel.

Typical liquid hydrocarbon charge fuels which may be employed include various oils derived from petroleum including distillates and residues such as crude petroleum, reduced crude, gas oil, cycle gas oil, coker gas oil, furfural extract of coker gas oil, etc; oil derived from coal, tar sands, lignite, etc. such liquids may be employed in the form of a slurry which includes 100 parts of solid coal or coke with 40–150 parts, preferably 50–100 parts, say 55–60 parts of liquid. Gaseous hydrocarbon charge fuels may also be employed.

The slurrying agent or entraining gas employed may also act as a temperature moderator for the partial oxidation reaction. If desired, there can also be charged a supplemental temperature moderator to moderate the temperature in the reaction zone. Moderators may be necessary when the charge includes liquid vaporizable hydrocarbons in order to simultaneously achieve desired conversion level (optimum efficiency) and temperature (fixed by materials of construction). When employed, they may be admitted with any of the charge streams or separately. Typical temperature moderators may include super-heated steam, saturated steam, carbon dioxide-rich gas, cooled exhaust from downstream turbines, nitrogen-in-air, by-product nitrogen from a conventional air separation unit, etc.

The charge to the partial oxidation reactor also includes a free-oxygen-containing gas. Typical of such gases which contain at least about 21 w% oxygen include air, oxygen-enriched air (containing more than 21 w% oxygen), substantially pure (e.g. greater than 95 w%) oxygen, etc. Commonly, the free-oxygen-containing gas contains oxygen plus other gases derived from the air from which the oxygen was prepared. The atomic ratio of oxygen (in the free-oxygen-containing gas) to carbon (in the fuel) may be 0.7–1.6. When the oxygen-containing gas is substantially pure oxygen, the ratio may be 0.7–1.5, preferably 0.9. When it is air, the ratio may be 0.8–1.6, say 1.3. When water is employed as the temperature moderator, the weight ratio of water to carbon in the fuel may be 0–2.0, preferably 0.2–0.6, say 0.5.

In typical operation according to a preferred embodiment, the total charge might contain 100 parts of ground petroleum coke, 60 parts of water as slurrying fluid, no temperature moderator, and sufficient free-oxygen-containing gas to attain an atom ratio of 1.3 free oxygen to carbon in the fuel. In another embodiment, in the total charge may contain 100 parts of ground petroleum coke, 100 parts of light cycle gas oil, 160 parts of superheated steam and sufficient enriched air containing 80 w% oxygen to attain a ratio of 1.0 free oxygen atoms per atom of carbon in the fuel.

In practice of the process of this invention, the carbon-containing charge is heated, preferably as a coke-water slurry, to 25° C.–300° C., say 250° C. prior to admission to gasification; and the free-oxygen-containing gas may be heated to 25° C.–500° C., say 80° C. When employed, the supplemental temperature moderator may be heated to 25° C.–300° C., say 270° C.

The charge materials, including free-oxygen-containing gas and moderator are admitted to a partial oxidation synthesis gas generator, typified by that set forth in coassigned in U.S. Pat. No. 2,818,326 (Eastman et al.). This generator includes an annulus-type burner (such as is typified by that set forth in coassigned U.S. Pat. Nos. 2,928,460, (Eastman et al.) 4,328,006 (Muenger et al.) or 4,328,008 (Muenger et al.) in a vertical cylindrical steel pressure vessel lined with a thermal refractory material.

As the charge components are admitted to the reaction vessel-combustion chamber, incomplete combustion is effected to yield a product hot raw gas which principally contains hydrogen, carbon monoxide, steam and carbon dioxide. Other materials which are typically present include hydrogen sulfide ($H_2S$), carbonyl sulfide (COS), methane, ammonia, nitrogen, and inert gases typified by argon.

The principal gaseous components, in the product raw synthesis gas may include the following (volume % on a dry basis) when substantially pure oxygen is fed to the combustion chamber:

TABLE I

| Component | Broad | Typical |
| --- | --- | --- |
| Carbon Monoxide | 30–60 | 51 |
| Hydrogen | 5–40 | 43 |

TABLE I-continued

| Component | Broad | Typical |
|---|---|---|
| Carbon Dioxide | 5–35 | 5.0–15.0 |
| Hydrogen Sulfide + COS | 0–5 | 0.6 |
| Nitrogen | 0–5 | 0.2 |
| Methane | 0–2 | 0.3 |
| Inert Gases | 0–1.5 | 0.3 |
| Ammonia | 0–0.5 | 0.02 |

When air replaces the pure oxygen, the composition may be as follows (volume % dry basis):

TABLE II

| Component | Broad | Typical |
|---|---|---|
| Carbon Monoxide | 10–35 | 18 |
| Hydrogen | 2–20 | 12 |
| Carbon Dioxide | 5–25 | 7 |
| Hydrogen Sulfide + COS | 0–3 | 0.5 |
| Nitrogen | 45–70 | 62 |
| Methane | 0–2 | 0.1 |
| Inert Gases | 0.1–1.5 | 0.8 |

The autogenous temperature in the combustion chamber of the gas generation zone may be 1100° C.–1600° C., say 1400° C. at 100–1500 psig, preferably 500–1200 psig, say 900 psig. Residence time for gasification may be 1–10 seconds, preferably 1–7 seconds, say about 2–5 seconds.

When the charge includes a solid, such as a coal or petroleum coke, the product synthesis gas contains a particulate ash phase containing up to about 20 w% of the organic carbon in the feed and typically about 1 w%–8 w%, say 5 w%. The particulate ash is entrained in the synthesis gas exiting the reaction zone.

During the partial oxidation reaction, partially reacted or unreacted carbonaceous material as well as inorganic material such as metals and metal compounds derived from the ash portion of the charge fuel form a molten slag. Slag is defined as substantially molten ash or molten ash which has solidified into glassy particles. Molten slag accumulates on the vertical walls of the gasifier reactor, and ideally flows freely out of the reactor via the outlet located at the bottom of the reaction zone. However, incomplete melting of the ash often causes the viscosity of the slag to increase, resulting in the accumulation of slag, together with its metal constituents, on the walls and refractory of the gasification reactor. This accumulation of slag often leads to reactor operability problems as well as potential damage to the reactor refractory.

It is known that various fluxing agents, when added to the charge fuel, will decrease the viscosity of the slag formed, thereby facilitating discharge of the slag from the reactor. For example, it has been found that iron-containing fluxing agents are particularly useful in producing a slag with a lower viscosity, and that such additives are also effective in preventing the formation of toxic nickel subsulfide ($Ni_3S_2$) in slags generated during the partial oxidation of carbonaceous charge fuels comprising sulfur and nickel compounds, such as petroleum coke (see coassigned U.S. Pat. No. 4,651,804). It has also been found that the use of iron-containing fluxing agents is effective in producing a liquid phase washing agent that collects and transports vanadium and nickel impurities from the partial oxidation reaction zone (see co-assigned U.S. patent application Ser. No. 947,122).

It is particularly advantageous to employ presulfided iron-containing compounds as slag fluxing agents in a partial oxidation process. This is due to the fact that the sulfide form of the iron-containing fluxing agent ordinarily melts at a lower temperature than the oxide form, and therefore the sulfide form is more immediately available to encapsulate vanadium compounds and also to react with nickel compounds contained in the slag, thereby forming a lower viscosity molten slag which can freely flow from the partial oxidation reactor and also avoiding the problem of nickel subsulfide formation.

The instant invention discloses an integrated method of presulfiding iron-containing compounds for use as slag fluxing agents via contacting of the iron-containing compounds with sulfur-containing Claus unit tail gas. After contacting particles comprising iron-containing compounds with the sulfur-containing tail gas, at least a portion of the iron-containing compounds become iron sulfide-containing compounds. Particles comprising these compounds are then recycled and admixed with the charge fuel prior to introduction into the partial oxidation reactor.

The hot raw product synthesis gas produced by the partial oxidation of the charge fuel typically leaves the reaction zone through a centrally positioned discharge outlet in the bottom of the reaction zone, the outlet being coaxial with the central longitudinal axis of the reaction zone-gas generator. In the direct quench embodiment, the product gas is cooled or quenched in a quench vessel located directly below the reactor vessel by bubbling the gas through a body of aqueous liquid residing in the quench vessel.

In the indirect quench mode, the product gas exits the reaction zone and enters a radiant cooler which includes a lining and a means for removing radiant heat impinging on the liner. This preferably includes a heat exchange surface made up of a series of connected tubes arrayed preferably parallel to the main axis of the chamber. Heat exchange fluid passes through these tubes. The partially cooled raw synthesis gas then enters a convective cooler which further cools the gas, and in addition captures additional heat from the synthesis gas.

The partially cooled synthesis gas, whether cooled by the abovedescribed direct or indirect means or a combination thereof, is then passed to a particulate scrubber vessel wherein, by contact with aqueous scrubbing liquid, it is further cooled to 150° C.–300° C., preferably 200° C.–250° C., at 30–1450 psig, preferably 500–1000 psig, and the synthesis gas is scrubbed for removal of particulate matter entrained in the gas stream. Particulate-free synthesis gas exits from the upper portion of the particulate scrubber. Particulate matter scrubbed from the syngas is collected at the bottom portion of the particulate scrubber and sent to a clarifier unit, from which the particulate solids may optionally be recycled into the charge fuel for further partial oxidation, disposed of, or a combination thereof.

The particulate-free synthesis gas exits from the particulate scrubber and is introduced into an acid gas absorber unit. The acid gas absorber unit is preferably provided with packing, baffles, bubble plates, or the like to ensure intimate countercurrent gas-liquid contact between an acid gas absorbent (for example methanol) which is introduced into the upper portion of the absorber unit, and the synthesis gas which enters at the lower portion of the absorber unit. Contact between the synthesis gas and the absorbent causes the partial removal of acid-reacting gases from the synthesis gas stream. Rich absorbent containing the acid gases removed in the absorber exits from the lower portion of the absorber unit. Purified synthesis gas (hereinafter referred to as fuel gas) is discharged from the upper portion of the absorber unit, for eventual use in chemicals production, power generation, etc. A second gas stream (hereinafter referred to as the off-gas stream) which contains substantial amounts of sulfur-containing compounds, also exits from the acid gas absorber unit.

The off-gas must be further treated to remove sulfur and sulfur compounds from the off-gas stream. Typically, the off-gas stream is directed to a Claus process unit for sulfur removal and recovery. The Claus unit operates to convert a substantial portion of the sulfur-containing compounds in the off-gas (e.g. $H_2S$, COS) to elemental sulfur. However, the Claus unit recovery of sulfur compounds from the off-gas stream is not complete, and significant amounts of sulfur compounds are left in the gas stream exiting the Claus unit (hereinafter referred to as the tail gas). The tail gas thus often has too high a sulfur content to be safely released into the atmosphere.

In the instant invention, the sulfur-containing tail gas is directed to a tail gas reactor wherein the tail gas, which is at a temperature of 20°–550° C., preferably 120°–500° C. is contacted with particles comprising iron-containing compounds. The iron-containing compounds react with the sulfur compounds present in the tail gas, thereby: (i) reducing the sulfur concentration of the tail gas stream so that it may safely be discharged into the atmosphere; and (ii) forming iron sulfide-containing particles which may be recycled to the charge fuel. The particles comprising iron-containing compounds are of a particle size ranging from 0.1–2000 microns, and are preferably selected from the group consisting of iron oxides, iron carbonates, iron cyanides, iron chlorides, iron nitrates, mill scale, iron ore, and mixtures thereof. Iron oxide particles are particularly preferred.

The particles comprising iron-containing compounds may be contacted with the tail gas within the tail gas reactor by passing the tail gas over a fixed or moving bed of the particles in a batch or continuous mode, or most preferably by having the particles continuously fluidized by tail gas entering from the lower portion of the tail gas reactor using conventional circulating fluidized bed technology. In this manner, at least a portion of the iron oxide compounds contained within the particles are converted to iron sulfide, and these particles may be continuously captured within the tail gas reactor for recycling to the charge fuel stream.

Optionally, a portion of the sulfur-containing off-gas exiting the acid gas absorber may be diverted from the stream entering the Claus unit, and may instead be mixed with the tail gas stream entering the tail gas reactor to raise the sulfur concentration of the gas stream entering the tail gas reactor. In this manner, the degree of presulfiding of the particles comprising iron-containing compounds taking place within the tail gas reactor may be controlled and adjusted as appropriate for a given charge fuel and given type of particles.

As a result of the contacting of the tail gas and iron compound-containing particles within the tail gas reactor, the tail gas exits from the reactor essentially sulfur free, and thus may be discharged to the atmosphere or employed in other applications where a sulfur free gas is required. The iron sulfide-containing particles are conveyed via pneumatic means or by slurrying with water, oil, etc. and admixed with the carbonaceous charge fuel feed for the partial oxidation reactor. If desired, the iron sulfide-containing particles may be ground to a finer size distribution prior to admixture with the charge fuel.

As previously disclosed, the iron sulfide-containing particles act as a slag fluxing agent upon introduction into the partial oxidation reactor. The iron sulfide compounds encapsulate vanadium compounds present in the slag, and also react with nickel compounds present in the slag, thereby forming a lower viscosity molten slag which freely flows from the partial oxidation reactor. In addition, the problem of nickel subsulfide formation in the slag is avoided.

Figure 1:
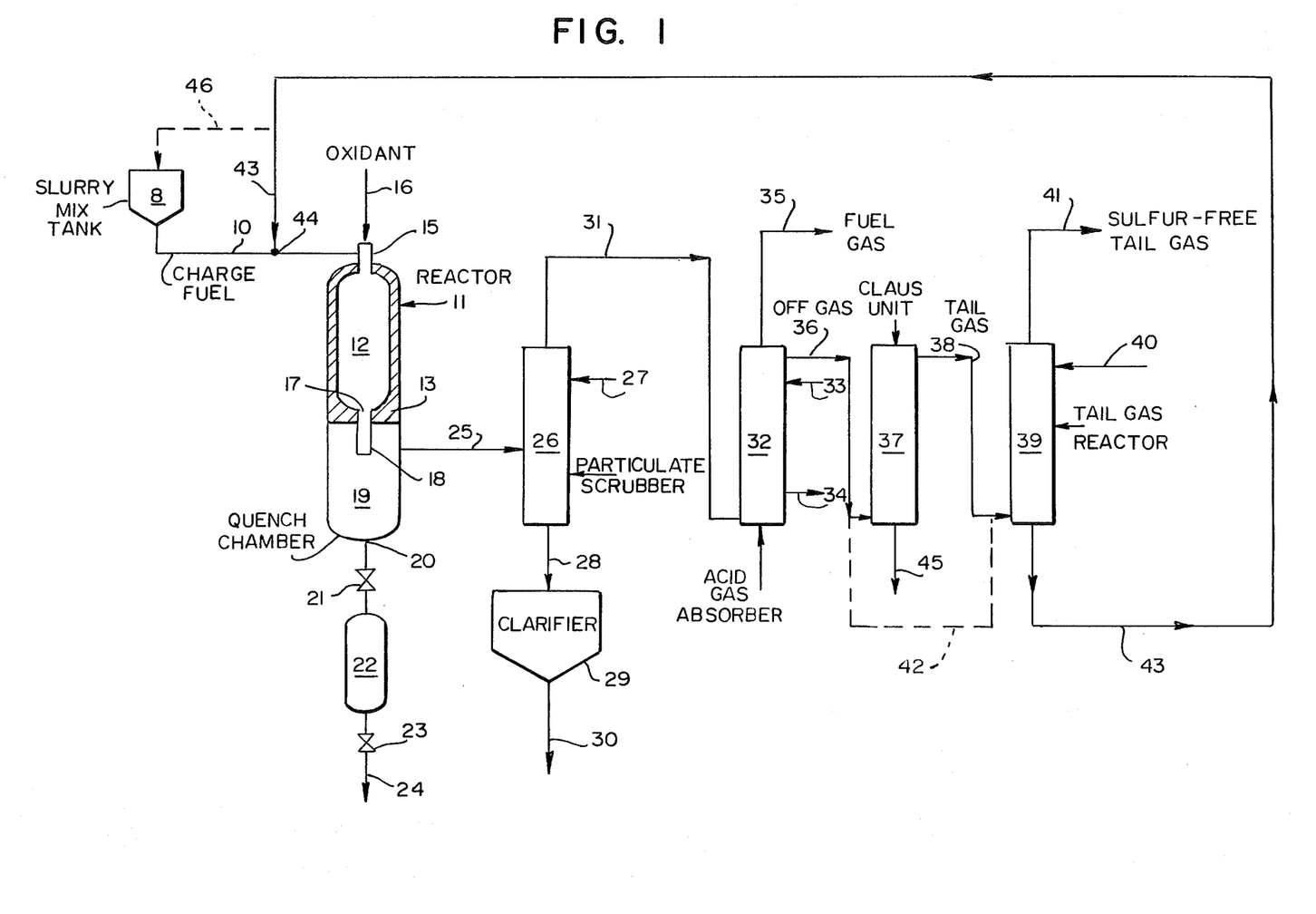
FIG. 1 depicts a schematic process flowsheet of a preferred embodiment of the instant invention, in which integrated tail gas sulfur removal and charge fuel pretreatment is employed in a partial oxidation process employing a direct quench means of initially cooling the raw synthesis gas produced via the partial oxidation process.

In the accompanying FIG. 1, which represents a preferred embodiment of practicing the instant invention, a carbonaceous charge fuel is prepared in slurry mix tank 8 and supplied through line 10 to the partial oxidation reactor 11 comprising a reaction chamber 12 and a refractory lining 13. The charge fuel, preheated to the desired extent, is introduced through a mixer-burner 15 into the reaction chamber 12 of the partial oxidation reactor. Oxygen from line 16 is supplied to burner 15 of the reactor where it is intimately mixed with the charge fuel supplied to the burner through line 10. Presulfided iron-containing particles are transported through line 43 and admixed via connection 44 with the charge fuel for introduction through line 10 to the mixer-burner 15. The mixture of charge fuel, presulfided iron-containing particles and oxygen, optionally including steam as an additional temperature moderator (which may be introduced through line 16), reacts in the reaction zone 12 at an autogenous temperature, typically in the range of about 2200°–3000° and at an elevated pressure, typically in the range of 200–1200 psig, to produce a sulfur-containing raw synthesis gas. In addition, slag comprising carbonaceous as well as inorganic (e.g. vanadium, nickel and other metallic compounds) are generated by the partial oxidation reaction.

Hot effluent synthesis gas from the reaction zone 12 of the partial oxidation reactor is discharged through a centrally positioned outlet in the bottom of the reaction zone 17 and flows through a dip tube 18 into quench chamber 19 where the synthesis gas has intimate direct contact with water contained therein. Molten slag produced by the partial oxidation reaction flows down the walls of the reaction zone 12 and exits via the centrally positioned outlet 17, thereafter flowing down the interior walls of the dip tube 18 and is discharged into the quench chamber 19 where the slag is further cooled by contacting with the water contained therein. Partially cooled slag settles to the bottom of the quench chamber 19 and is discharged from the quench chamber through a centrally positioned outlet 20 in the bottom of the quench chamber. The settling slag passes through upper lockhopper valve 21 and is collected in a lockhopper 22 for eventual discharge and/or recycle to the charge fuel via lower lockhopper valve 23 and discharge line 24. Upper lockhopper valve 21 and lower lock-hopper valve 23 are employed periodically in tandem to discharge accumulated slag from and to depressurize and repressurize lockhopper 22.

Partially cooled synthesis gas containing entrained particulate matter (such as soot and unconverted carbon) is passed through line 25 to a particulate scrubber 26 where it is further contacted and scrubbed in countercurrent flow with water introduced into the particulate scrubber through line 27. Water containing particulate matter removed from the synthesis gas in the particulate scrubber 26 is discharged via line 28 to a clarifier unit 29 where the particulate matter is collected and discharged through line 30 for eventual disposal and/or recycle to the charge fuel.

Particulate-free synthesis gas exits from the particulate scrubber 26 and is passed through line 31 to an acid gas absorber unit 32. The absorber 32 is preferably provided with packing, baffles, bubble plates, or the like to ensure intimate countercurrent gas-liquid contact between an acid gas absorbent, for example methanol, introduced into the upper part of absorber 32 through line 33 and synthesis gas entering the lower part of the absorber through line 31. In the acid gas absorber 32, the absorbent removes acid-reacting gases from the gas stream. Rich absorbent containing the acid gases removed in the absorber 32 is withdrawn from the bottom of the absorber tower through line 34. Substantially sulfur-free fuel gas is discharged from the upper portion of the absorber unit through line 35, for eventual use in chemicals production, power generation, and the like.

An off-gas stream containing sulfur and sulfur compounds exits from the absorber unit 32 through line 36 and is directed to a Claus process unit 37 for sulfur removal and recovery. The Claus unit 37 operates to convert a substantial portion of the sulfur-containing compounds in the entering off-gas stream 36 to elemental sulfur, which is collected in the Claus unit 37 and removed through line 45 for eventual sale and/or disposal.

A tail gas stream still comprising significant amounts of sulfur compounds exits the Claus unit 37 through line 38 and is directed to a tail gas reactor 39. The tail gas enters the lower portion of tail gas reactor 39 through line 38 and fluidizes iron compound-containing particles entering the tail gas reactor 39 through line 40. As a result of the intimate contacting of the tail gas and iron compound-containing particles within the tail gas reactor 39, tail gas exits from the tail gas reactor 39 essentially sulfur free through line 41, and may be discharged to the atmosphere or employed in other applications where a sulfur-free gas is required. Iron compound-containing particles entering the tail gas reactor 39 through line 40 react with the sulfur-containing compounds contained in the tail gas, with the result that the iron oxide compounds contained within the particles are at least partially reduced to iron sulfide compounds. The degree of reaction or presulfiding taking place within the tail gas reactor 39 is a function of the sulfur concentration of the tail gas entering the tail gas reactor 39 through line 38. To optimize and adjust the sulfur concentration of the tail gas stream 38, off-gas from line 36 may be partially diverted through line 42 for admixture with the tail gas stream 38 entering the tail gas reactor 39.

The partially sulfided or presulfided particles comprising iron-containing compounds such as iron sulfide are collected from the tail gas reactor 39 by means of conventional fluidized bed technology, and are transported by line 43 for recycle and admixture with the charge fuel at connection 44. The iron-sulfide containing particles may be conveyed via pneumatic means or by slurrying with water, oil, etc. through line 43 for admixture with the charge fuel at connection 44. The iron-sulfide containing particles may also optionally be admixed with the charge fuel by transporting the particles via line 46 to the slurry mix tank 8.

Figure 2:
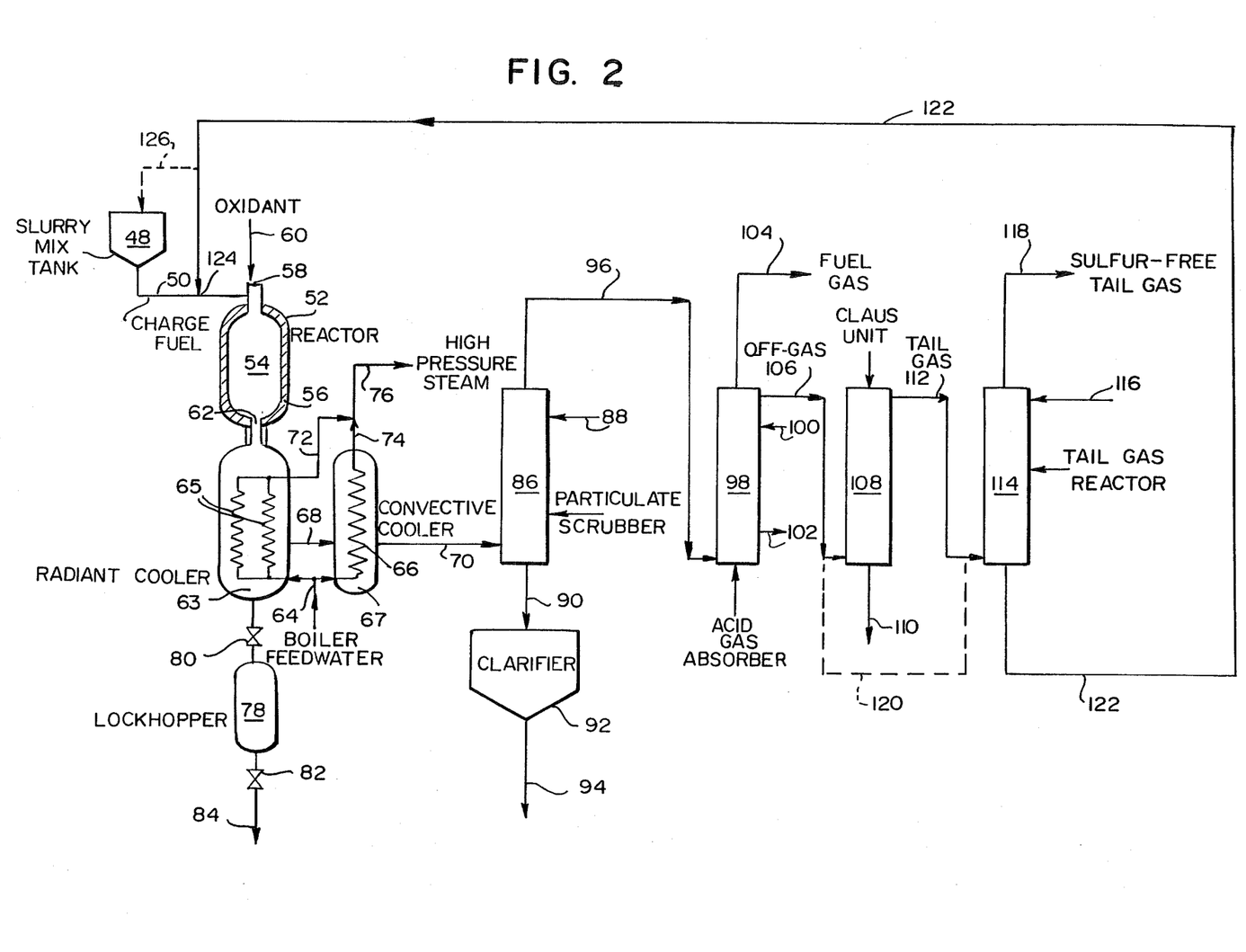
FIG. 2 depicts a schematic process flowsheet of another embodiment of the instant invention, in which integrated tail gas sulfur removal and charge fuel pretreatment is employed in a partial oxidation process employing an indirect means of initially cooling the raw synthesis gas produced via the partial oxidation process.

In the accompanying FIG. 2, which represents another embodiment of practicing the instant invention, a carbonaceous charge fuel is prepared in slurry mix tank 48 and supplied through line 50 to the partial oxidation reactor 52 comprising a reaction chamber 54 and a refractory lining 56. The charge fuel, preheated to the desired extent, is introduced through a mixer-burner 58 into the reaction chamber 54 of the partial oxidation reactor. Oxygen from line 60 is supplied to burner 58 of the reactor where it is intimately mixed with the charge fuel supplied to the burner through line 50. Presulfided iron-containing particles are transported through line 122 and admixed via connection 124 with the charge fuel for introduction through line 50 to the mixer-burner 58. The mixture of charge fuel, presulfided iron-containing particles and oxygen, optionally including steam as an additional temperature moderator (which may be introduced through line 60), reacts in the reaction zone 54 at an autogenous temperature, typically in the range of about 1200°–1650° F. and at an elevated pressure, typically in the range of 200–1200 psig, to produce a sulfur-containing raw synthesis gas. In addition, slag comprising carbonaceous as well as inorganic (e.g. vanadium, nickel and other metallic compounds) are generated by the partial oxidation reaction.

Molten slag produced by the partial oxidation reaction flows down the walls of the reaction zone 54 and exits via the centrally positioned outlet 62 in the bottom of the reaction zone, thereafter flowing down the interior walls of the radiant cooler vessel 63 and is discharged into the lockhopper vessel 78 by passing through upper lockhopper valve 80. The settling slag passes through upper lockhopper valve 80 and is collected in a lockhopper vessel 78 for eventual discharge and/or recycle to the charge fuel via lower lockhopper valve 82 and discharge line 84. Upper lockhopper valve 80 and lower lockhopper valve 82 are employed periodically in tandem to discharge accumulated slag and to depressurize and repressurize lockhopper 78.

Hot effluent synthesis gas from the reaction zone 54 of the partial oxidation reactor is discharged through a centrally positioned outlet in the bottom of the reaction zone 62 and flows into a radiant cooler vessel 63. Boiler feed water is pumped through line 64 into tube banks 65 located within the radiant cooler and also to tube banks 66 located within the convective cooler vessel 67. Hot raw synthesis gas entering the radiant cooler 63 via reaction zone outlet 62 is cooled by indirect heat exchange with the boiler feed water passing through tube banks 65, and the partially cooled synthesis gas is carried through line 68 into the convective cooler 67 where additional indirect heat exchange takes place between the gas and boiler feed water contained within tube banks 66. The partially cooled synthesis gas exits the convective cooler through line 70. The boiler feed water heated within tube banks 65 exits the radiant cooler through line 72, and the boiler feed water heated in tube banks 66 exits the convective cooler through line 74. The boiler feed water (which is now high pressure steam) is carried through line 76 for eventual use in power production or other uses where high pressure steam is required.

The partially cooled synthesis gas containing entrained particulate matter (such as soot and unconverted carbon) is passed through line 70 to a particulate scrubber 86 where it is further contacted and scrubbed in countercurrent flow with water introduced into the particulate scrubber through line 88. Water containing particulate matter removed from the synthesis gas in the particulate scrubber 86 is discharged via line 90 to a clarifier unit 92 where the particulate matter is collected and discharged through line 94 for eventual disposal and/or recycle to the charge fuel.

Particulate-free synthesis gas exits from the particulate scrubber 86 and is passed through line 96 to an acid gas absorber unit 98. The absorber 98 is preferably provided with packing, baffles, bubble plates, or the like to ensure intimate countercurrent gas-liquid contact between an acid gas absorbent, for example methanol, introduced into the upper portion of absorber 98 through line 100 and synthesis gas entering the lower part of the absorber through line 96. In the acid gas absorber 98, the absorbent removes acid-reacting gases from the gas stream. Rich absorbent containing the acid gases removed in the absorber 98 is withdrawn from the bottom of the absorber tower through line 102. Substantially sulfur-free fuel gas is discharged from the upper portion of the absorber unit through line 104, for eventual use in chemicals production, power generation and the like.

An off-gas stream containing sulfur and sulfur compounds exits from the absorber unit 98 through line 106 and is directed to a Claus process unit 108 for sulfur removal and recovery. The Claus unit 108 operates to convert a substantial portion of the sulfur-containing compounds in the entering off-gas stream 106 to elemental sulfur, which is collected in the Claus unit 108 and removed through line 110 for eventual sale and/or disposal.

A tail gas stream still comprising significant amounts of sulfur compounds exits the Claus unit 108 through line 112 and is directed to a tail gas reactor 114. The tail gas enters the lower portion of tail gas reactor 114 through line 112 and fluidizes iron compound-containing particles entering the tail gas reactor 114 through line 116. As a result of the intimate contacting of the tail gas and iron compound-containing particles within the tail gas reactor 114, tail gas exits from the tail gas reactor essentially sulfur-free through line 118, and may be discharged to the atmosphere or employed in other applications where a sulfur-free gas is required. Iron compound-containing particles entering the tail gas reactor 114 through line 116 react with the sulfur-containing compounds contained in the tail gas, with the result that iron oxide compounds contained within the particles are at least partially reduced to iron sulfide compounds. The degree of reaction or presulfiding taking place within the tail gas reactor 114 is a function of the sulfur concentration of the tail gas entering the tail gas reactor 114 through line 112. To optimize and adjust the sulfur concentration of the tail gas stream entering through line 112, off-gas from line 106 may be partially diverted through line 120 for admixture with the tail gas stream 112 entering the tail gas reactor 114.

Particles comprising the partially sulfided or presulfided iron-containing compounds such as iron sulfide are collected from the tail gas reactor 114 by means of conventional fluidized bed technology, and are transported by line 122 for recycle and admixture with the charge fuel at connection 124. The iron sulfide containing particles may be conveyed via pneumatic means or by slurrying with water, oil, etc. through line 122 for admixture with the charge fuel at connection 124. The iron-sulfide containing particles may also optionally be admixed with the charge fuel by transporting the particles via line 126 to the slurry mix tank 48.

It will be understood by one skilled in the art that the Figures and accompanying descriptions, while generally describing the method of the instant invention generally, omit for the sake of simplicity numerous safety devices and automatic controls normally associated with high pressure gas generation processes which are known to those skilled in the art and are not essential to the detailed description of this invention. In addition, the Figures and accompanying descriptions omit various gas, solid and liquid side streams, grinding operations, vessel internals, valving and piping configurations, etc. which are known to those skilled in the art and are not essential to the detailed description of this invention.

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

I claim:

1. A method for producing a synthesis gas comprising:
   (a) partially oxidizing a sulfur- and metal-containing carbonaceous charge fuel in the presence of a temperature moderator and an oxygen-containing gas to produce a sulfur-containing hot synthesis gas and a metal-containing molten slag;
   (b) partially cooling the sulfur-containing synthesis gas via direct or indirect means or a combination thereof;
   (c) scrubbing the partially cooled sulfur-containing synthesis gas with aqueous scrubbing liquor to remove particulates and further cool the synthesis gas;
   (d) further scrubbing the partially cooled sulfur-containing synthesis gas with a scrubbing liquor to produce:
      (i) a fuel gas stream with a substantially reduced sulfur content; and
      (ii) an off-gas stream comprising sulfur-containing compounds;
   (e) directing the off-gas stream comprising sulfur-containing compounds to a Claus process unit to produce elemental sulfur and a tail gas stream comprising residual amounts of sulfur-containing compounds;
   (f) contacting the tail gas stream with particles comprising iron-containing compounds, thereby:
      (i) forming iron sulfide-containing particles; and
      (ii) producing an essentially sulfur-free tail gas stream; and
   (g) recycling at least a portion of the iron sulfide-containing particles of step (f) by mixing the particles with the carbonaceous charge fuel of step (a) prior to the partial oxidation of the charge fuel.

2. The method of claim 1, wherein said charge fuel is selected from the group consisting of crude residue from petroleum distillation and cracking process operations, petroleum distillate, reduced crude, whole crude, asphalt, coal, coal tar, coal derived oil, petroleum coke, shale oil, tar sand oil, and mixtures thereof.

3. The method of claim 1, wherein said charge fuel is slurried with water, a liquid hydrocarbon fuel, liquid $CO_2$ or mixtures thereof.

4. The method of claim 1, wherein the partial oxidation of said charge fuel takes place at a temperature range of 1100° C.–1600° C., and a pressure range of 500–1200 psig.

5. The method of claim 1, wherein said hot synthesis gas is partially cooled via direct or indirect heat exchange, or a combination thereof, to a temperature range of 30°–550° C.

6. The method of claim 1, wherein said particles comprising iron-containing compounds are of a particle size ranging from 0.1–2000 microns.

7. The method of claim 1, wherein said iron-containing compounds are selected from the group consisting of iron oxides, iron carbonates, iron cyanides, iron chlorides, iron nitrates, and mixtures thereof.

8. The method of claim 1, wherein said sulfur-containing tail gas stream is passed over a fixed or moving bed of particles comprising iron-containing compounds to contact the synthesis gas with the particles.

9. The method of claim 1, wherein said sulfur-containing tail gas stream fluidizes a bed of particles comprising iron-containing compounds to contact the synthesis gas with the particles.

10. The method of claim 1, wherein the concentration of sulfur-containing compounds in the tail gas stream is increased via admixture with at least a portion of the off-gas stream which is diverted prior to treatment in the Claus process unit.

11. A method for producing a synthesis gas comprising:
(a) partially oxidizing a sulfur- and metal-containing petroleum coke charge fuel in the presence of a temperature moderator and an oxygen-containing gas to produce a sulfur-containing hot synthesis gas and a metal-containing molten slag;
(b) partially cooling the sulfur-containing synthesis gas via indirect means by passing the synthesis gas through one or more vessels having tube banks containing flowing water;
(c) scrubbing the partially cooled sulfur-containing synthesis gas with aqueous scrubbing liquor to remove particulates and further cool the synthesis gas;
(d) further scrubbing the partially cooled sulfur-containing synthesis gas with a scrubbing liquor to produce:
(i) a fuel gas stream with a substantially reduced sulfur content; and
(ii) an off-gas stream comprising sulfur-containing compounds;
(e) directing the off-gas stream comprising sulfur-containing compounds to a Claus process unit to produce elemental sulfur and a tail gas stream comprising residual amounts of sulfur-containing compounds;
(f) contacting the tail gas stream with particles comprising iron-containing compounds, thereby:
(i) forming iron sulfide-containing particles; and
(ii) producing an essentially sulfur-free tail gas stream; and
(g) recycling at least a portion of the iron sulfide-containing particles of step (f) by mixing the particles with the petroleum coke charge fuel of step (a) prior to the partial oxidation of the charge fuel.

12. A method for producing a synthesis gas comprising:
(a) partially oxidizing a sulfur- and metal-containing petroleum coke charge fuel in the presence of a temperature moderator and an oxygen-containing gas to produce a sulfur-containing hot synthesis gas and a metal-containing molten slag;
(b) partially cooling the sulfur-containing synthesis gas via direct means by contacting the synthesis gas with water in a quenching vessel;
(c) scrubbing the partially cooled sulfur-containing synthesis gas with aqueous scrubbing liquor to remove particulates and further cool the synthesis gas;
(d) further scrubbing the partially cooled sulfur-containing synthesis gas with a scrubbing liquor to produce:
(i) a fuel gas stream with a substantially reduced sulfur content; and
(ii) an off-gas stream comprising sulfur-containing compounds;
(e) directing the off-gas stream comprising sulfur-containing compounds to a Claus process unit to produce elemental sulfur and a tail gas stream comprising residual amounts of sulfur-containing compounds;
(f) contacting the tail gas stream with particles comprising iron-containing compounds, thereby:
(i) forming iron sulfide-containing particles; and
(ii) producing an essentially sulfur-free tail gas stream; and
(g) recycling at least a portion of the iron sulfide-containing particles of step (f) by mixing the particles with the petroleum coke charge fuel of step (a) prior to the partial oxidation of the charge fuel.

13. A method for producing a synthesis gas comprising:
(a) partially oxidizing a sulfur- and metal-containing petroleum coke charge fuel in the presence of a temperature moderator and an oxygen-containing gas to produce a sulfur-containing hot synthesis gas and a metal-containing molten slag;
(b) partially cooling the sulfur-containing synthesis gas via indirect means by passing the synthesis gas through one or more vessels having tube banks containing flowing water;
(c) scrubbing the partially cooled sulfur-containing synthesis gas with aqueous scrubbing liquor to remove particulates and further cool the synthesis gas;
(d) further scrubbing the partially cooled sulfur-containing synthesis gas with a scrubbing liquor to produce:
(i) a fuel gas stream with a substantially reduced sulfur content; and
(ii) an off-gas stream comprising sulfur-containing compounds;
(e) directing a first portion of the off-gas stream comprising sulfur-containing compounds to a Claus process unit to produce elemental sulfur and a tail gas stream comprising residual amounts of sulfur-containing compounds;
(f) diverting a second portion of the off-gas stream for admixture with the tail gas stream exiting the Claus process unit;
(g) contacting the tail gas stream-off-gas stream mixture of step (f) with particles comprising iron-containing compounds, thereby:
(i) forming iron sulfide-containing particles; and
(ii) producing an essentially sulfur-free tail gas stream; and
(h) recycling at least a portion of the iron sulfide-containing particles of step (g) by mixing the particles with the petroleum coke charge fuel of step (a) prior to the partial oxidation of the charge fuel.

14. A method for producing a synthesis gas comprising:
(a) partially oxidizing a sulfur- and metal-containing petroleum coke charge fuel in the presence of a temperature moderator and an oxygen-containing gas to produce a sulfur-containing hot synthesis gas and a metal-containing molten slag;
(b) partially cooling the sulfur-containing synthesis gas via direct means by contacting the synthesis gas with water in a quenching vessel;
(c) scrubbing the partially cooled sulfur-containing synthesis gas with aqueous scrubbing liquor to remove particulates and further cool the synthesis gas;
(d) further scrubbing the partially cooled sulfur-containing synthesis gas with a scrubbing liquor to produce:
  (i) a fuel gas stream with a substantially reduced sulfur content; and
  (ii) an off-gas stream comprising sulfur-containing compounds;
(e) directing a first portion of the off-gas stream comprising sulfur-containing compounds to a Claus process unit to produce elemental sulfur and a tail gas stream comprising residual amounts of sulfur-containing compounds;
(f) diverting a second portion of the off-gas stream for admixture with the tail gas stream exiting the Claus process unit;
(g) contacting the tail gas stream-off-gas stream mixture of step (f) with particles comprising iron-containing compounds, thereby:
  (i) forming iron sulfide-containing particles; and
  (ii) producing an essentially sulfur-free tail gas stream; and
(h) recycling at least a portion of the iron sulfide-containing particles of step (g) by mixing the particles with the petroleum coke charge fuel of step (a) prior to the partial oxidation of the charge fuel.

15. The method of claim 1, wherein said iron-containing compounds are obtained from mill scale or iron ore.

* * * * *